Aug. 25, 1931.                S. OLSON                1,820,674
SAFETY SHUT-OFF DEVICE FOR CONVEYER SYSTEMS
Filed March 5, 1929
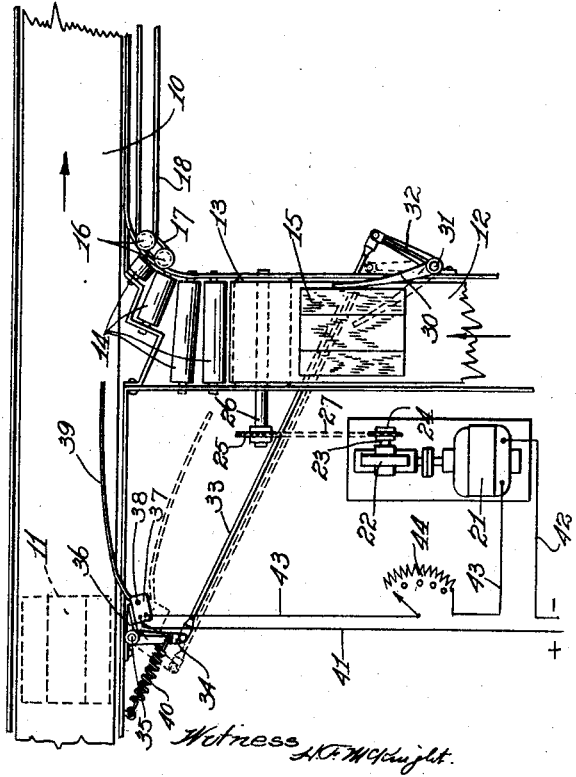
Inventor.
Samuel Olson
by
his Attorneys.

Patented Aug. 25, 1931

1,820,674

UNITED STATES PATENT OFFICE

SAMUEL OLSON, OF OAK PARK, ILLINOIS, ASSIGNOR TO SAMUEL OLSON & COMPANY, INC., OF CHICAGO, ILLINOIS, A CORPORATION OF ILLINOIS

SAFETY SHUT-OFF DEVICE FOR CONVEYER SYSTEMS

Application filed March 5, 1929. Serial No. 344,165.

The present invention pertains to conveyer systems wherein two cooperating conveyers have a common junction at which loads are transferred from one conveyer to the other, and has for an object to provide improved means, automatically actuated by the loads carried on the conveyers for controlling the operation of the conveyer system to avoid collision of loads during transfer from one to the other. It consists in certain features and elements of construction in combination, as herein shown and described and as indicated by the claims.

In the drawings:

Figure 1 is a fragmentary plan view of a conveyer system, embodying the present invention.

Figure 2 is a fragmentary plan view of a modified arrangement.

Figure 3 is an enlarged detail view of a limit switch employed in connection with this invention.

For the purpose of illustration, my invention is shown in the drawings as employed in connection with two horizontally travelling conveyers, wherein loads are transferred from one to the other. With reference to the construction shown in Fig. 1, a main belt conveyer is indicated at 10, which may be understood to be normally in operation and driven by suitable mechanism (not shown). Indicated in dotted outline on the conveyer is a load, 11, shown as a box. Extending transversely of the main conveyer is a branch or feeding belt conveyer, 12, trained over a head pulley, 13, spaced a short distance away from the main conveyer belt. The intervening gap between the conveyers is spanned by a series of rolls, 14, arranged in a curvilinear path, so as to assist in feeding loads (as indicated at 15, on the branch conveyer) onto the main conveyer. The transfer of loads from the branch to the main conveyer may be expedited and rendered more positive by providing a pair of live rolls, 16, at the inner side of the curve in position to engage the load or box as it is fed from the branch conveyer. These live rolls are interconnected by a belt, 17, and are operated from a convenient source of power (not shown) by a drive belt, 18.

Adjacent to and arranged for driving the branch conveyer is an electric motor, 21, driving a speed reducer 22, having a take off shaft, 23, provided with a sprocket, 24, adapted to operatively drive sprocket, 25, on the pulley head shaft, 26, of the branch conveyer, by a chain belt, 27. The operation of the motor, 21, for driving this branch conveyer is controlled by mechanism hereinafter described, and is arranged to stop the motor when the loads, 11 and 15 on the main and branch conveyers, respectively, are so related in speed and distance from the junction or transfer point that they would normally collide.

Normally extending into the path of travel of loads on the branch conveyer, 12, is an operating arm, 30, pivoted at 31, at the side of the conveyer. Co-pivotally mounted for movement with the operating arm is a lever arm, 32, pivotally connected at its outer end to an operating rod, 33, the opposite end of which is pivoted to the outer end of an arm, 34, of a bell crank pivotally mounted at 35, adjacent the main conveyer, forwardly of the junction (with respect to the direction of travel of the main conveyer). Rigidly secured to and movable with the other arm, 36, of the bell crank is a normally closed limit switch, 37, as shown in Fig. 3, and described in detail in my Patent No. 1,645,619, issued October 18, 1927. Pivoted at 38, in said switch is an operating arm, 39, extending toward and terminating adjacent the junction and movable over the main belt, 12, into the path of travel of loads thereon, but normally positioned out of the path of travel of loads on the main conveyer, as indicated in dotted lines in Fig. 1. A tension spring, 40, is connected to the bell crank arm, 34, for yieldingly returning the linkage to normal position.

The electrical circuit for controlling the operation of the motor of the branch conveyer includes two conductors, 41 and 42, connecting one terminal of the switch and motor respectively to a convenient source of power; and a conductor, 43, connecting the other terminals of the switch and motor respectively with a starter, 44, interposed in the line.

The operation of the device is as follows: When a load, 15, travelling on the branch conveyer, 12, impinges against the operating arm, 30, causing it to swing outwardly about its pivot, 31, the lever, 32, being caused to swing therewith shifts the operating rod, 33, swinging the bell crank about its pivot, against the reaction of the spring, 40, so as to move the switch operating arm, 39, into the path of travel of the load, 11, on the main conveyer, 10. Thus if the load, 11, does not arrive in time to engage the switch arm, 39, during the time that arm, 30, is operated by the load, 15, on the branch conveyer, the branch conveyer will continue to operate, and discharge its load onto the main conveyer. However, if the load, 15, on the branch conveyer engages arm, 30, causing arm, 39, to be moved into the path of travel of load, 11, on the main conveyer at the time that load, 11, actually arrives to engage the arm, 39, it will swing said arm outwardly about its pivot, 38, breaking the electrical circuit and causing the branch conveyer to be arrested until load, 11, passes beyond and releases the switch arm, 39; thus preventing collision of the loads at the junction or intersection. The relatively long switch arm, 39, extending adjacent the junction, insures maintaining the branch conveyer inoperative until the load on the main conveyer is safely out of danger of collision with the loads to be transferred from the branch conveyer.

The modified arrangement shown in Fig. 2 is similar to that shown in Fig. 1, except that the load engaging arms are respectively arranged for cooperation with the opposite conveyers. The operating arm, 30ª, which is positioned normally in the path of travel of loads 11ª on the main conveyer 10ª, is pivoted approximately the same distance from the junction as arm, 30, in Fig. 1. This arm is of substantial length, terminating adjacent the junction, thereby insuring that the load 11ª will not collide with a load 15ª of the branch conveyer 12ª, because between the time when the load 11ª first actuates arm 30ª, and when said load releases said arm, the switch arm, 39ª has been held projecting into the path of travel of load, 15ª on the branch conveyer, and if load 15ª arrives in time to engage said switch arm 39ª, it will move said arm to switch opening position, breaking the electrical circuit and arresting the branch conveyer until load 11ª releases operating arm, 30ª, thus permitting the switch arm to return to switch closing position, the linkage being returned to normal position by the spring 40.

I claim:

1. A conveying system comprising a main conveyer, and a branch conveyer having a source of power, said conveyers having a junction at which loads are transferred from one to the other, an operating member mounted adjacent one of the conveyers and normally positioned in the path of travel of loads thereon, an operating member mounted adjacent the other conveyer and normally positioned out of the path of travel of loads carried thereon, means interconnecting said members, adapted, when said first mentioned operating member is actuated by a load on its conveyer, to shift said second operating member into the path of travel of loads on the second conveyer, and means operable by the conjoint actuation of said operating members by loads on the respective conveyers adapted to disconnect the source of power for arresting said branch conveyer.

2. A conveying system including two conveyers having a junction at which loads are transferred from one to the other, one of said conveyers being power driven and having an electrical circuit for controlling the operation thereof, a normally closed switch connected in said circuit having an operating member disposed adjacent one of the conveyers, said member being positioned so as to be normally unaffected by loads carried on said conveyer, and means adjacent the other conveyer, operable by loads thereon for shifting said switch operating member in position for encounter with loads on said first mentioned conveyer for breaking the electrical circuit and arresting the power driven conveyer.

3. A conveying system including a main line conveyer, a branch line conveyer having a source of power, and an electrical circuit for controlling the operation of said branch line, a normally closed switch connected in the electrical circuit and having associated therewith an operating member normally positioned out of operable engagement with loads carried on one of the conveyers and means adjacent the other conveyer, operable by loads carried thereon for moving said switch operating member into position for engagement with a load on said first mentioned conveyer whereby to open said switch, breaking the electrical circuit and arresting the branch conveyer.

4. A conveyer system including two conveyers operating in transverse directions and having a junction at which loads are fed from one conveyer to the other, the feeding conveyer having a source of power and an electrical circuit for controlling the operation thereof, a normally closed switch connected in said circuit, a load actuated arm mounted adjacent each conveyer and mechanical connections between both arms and the switch arranged and adapted to render the switch operative for opening the circuit only when said arms are conjointly actuated by loads on the respective conveyers, whereby such conjoint actuation serves to break the electrical circuit and arrest the feeding conveyer.

5. In the combination defined in claim 4, one of said arms being normally disposed in the path of travel of loads on the conveyer, and the other arm being normally positioned out of the path of travel of loads on its respective conveyer, said means including interconnection of said arms whereby the encounter of the first arm by a load on its conveyer, simultaneously shifts the other arm into the path of travel of loads on its respective conveyer.

6. In the combination defined in claim 4, linkage interconnecting said arms for actuation of one by the other.

7. In the combination defined in claim 4, linkage interconnecting said arms for conjoint movement in one direction only, and operably connected to the switch, one of said arms being movable in the opposite direction independently of said other arm.

8. In the combination defined in claim 4, one of said arms being normally disposed in the path of travel of loads on the conveyer, and the other arm being normally positioned out of the path of travel of loads on its respective conveyer, said means including interconnection of said arms whereby the encounter of the first arm by a load on its conveyer, simultaneously shifts the other arm into the path of travel of loads on its respective conveyer and yielding means tending to restore said arms to normal position.

9. A conveying system including a main conveyer and a branch conveyer for feeding loads onto the main conveyer, said branch conveyer having a separate source of power and an electrical circuit for controlling the operation thereof, a load engaging operating arm mounted adjacent one conveyer and normally extending into the path of travel of loads carried on said conveyer, a lever pivotally mounted adjacent the other conveyer, linkage connecting said arm and lever for conjoint actuation, a normally closed switch connected in said electrical circuit and mounted for movement with said lever, and a second load engaging operating arm carried by and adapted to control said switch and normally positioned out of the path of travel of loads on the adjacent conveyer, whereby the actuation of the first mentioned arm by a load on its respective conveyer, moves said lever and switch for positioning the second mentioned arm in the path of travel of loads on the second conveyer.

10. In the combination defined in claim 9, said second mentioned arm being normally urged into switch closing position and arranged so that the conjoint actuation of said operating arms by loads on the respective conveyers, opens said switch, breaking the electrical circuit and arresting the branch conveyer.

11. In a conveyer system including two conveyers having a junction at which loads are transferred from one to the other, one of said conveyers being power driven and having an electrical circuit for controlling the operation thereof, a normally closed switch connected in the electrical circuit, an operating member associated with the switch and disposed adjacent one of the conveyers, and normally positioned out of the path of travel of loads on said conveyer, and means projected into the path of travel of loads on the other conveyer so that when one of said loads encounters said means the latter will cause said operating member to be moved into position for engagement by a load on the first mentioned conveyer, said member being adapted when so engaged to open the switch breaking the electrical circuit and arresting the conveyer.

SAMUEL OLSON.